United States Patent
Birnbaum

(10) Patent No.: US 11,539,869 B2
(45) Date of Patent: Dec. 27, 2022

(54) CAMERA WITH LOW-PROFILE ACTUATOR ARRANGEMENT

(71) Applicant: Apple Inc., Cupertino, CA (US)

(72) Inventor: Zachary W. Birnbaum, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/326,226

(22) Filed: May 20, 2021

(65) Prior Publication Data

US 2021/0368079 A1    Nov. 25, 2021

Related U.S. Application Data

(60) Provisional application No. 63/029,298, filed on May 22, 2020.

(51) Int. Cl.
| | |
|---|---|
| *H04N 5/225* | (2006.01) |
| *H04N 5/232* | (2006.01) |
| *G02B 7/09* | (2021.01) |
| *G03B 13/36* | (2021.01) |
| *H04N 5/247* | (2006.01) |
| *G02B 7/02* | (2021.01) |

(52) U.S. Cl.
CPC ........... *H04N 5/2257* (2013.01); *G02B 7/021* (2013.01); *G02B 7/09* (2013.01); *G03B 13/36* (2013.01); *H04N 5/2253* (2013.01); *H04N 5/2254* (2013.01); *H04N 5/247* (2013.01)

(58) Field of Classification Search
CPC ............................ H04N 5/2252; H04N 5/2257
USPC ........................................ 348/373, 374, 376
See application file for complete search history.

(56) References Cited

U.S. PATENT DOCUMENTS

| | | | |
|---|---|---|---|
| 10,165,162 B2* | 12/2018 | Eromaki | H05K 1/181 |
| 10,547,788 B2 | 1/2020 | Park et al. | |
| 2017/0353662 A1 | 12/2017 | Enta | |
| 2018/0364441 A1 | 12/2018 | Hubert et al. | |
| 2021/0185201 A1* | 6/2021 | Ta Van | H04N 5/2252 |
| 2021/0195073 A1* | 6/2021 | Saito | H04N 5/2253 |
| 2021/0297515 A1* | 9/2021 | Yu | H04N 5/2254 |

FOREIGN PATENT DOCUMENTS

| | | |
|---|---|---|
| JP | 2008065221 | 3/2008 |
| KR | 20200002358 | 10/2020 |

OTHER PUBLICATIONS

International Search Report and Written Opinion from PCT/US2021/033687, dated Jul. 27, 2021, pp. 1-13.

* cited by examiner

*Primary Examiner* — Anthony J Daniels
(74) *Attorney, Agent, or Firm* — Robert C. Kowert; Kowert, Hood, Munyon, Rankin & Goetzel, P.C.

(57) ABSTRACT

Various embodiments include a camera having an actuator arrangement with a low-profile actuator arrangement. For example, the camera may include a voice coil motor (VCM) actuator to move a lens group and/or an image sensor of the camera. According to some embodiments, the VCM actuator may include one or more magnet-coil groups located beside an image sensor package of the camera. In some embodiments, a magnet-coil group may be located between the image sensor package and a side wall of the camera. Additionally, or alternatively, the magnet-coil group may at least partially extend (e.g., in a direction parallel to an optical axis defined by the lens group) past an upper surface of the image sensor and a bottom of the camera in some embodiments.

20 Claims, 5 Drawing Sheets

CAMERA WITH LOW-PROFILE ACTUATOR ARRANGEMENT

This application claims benefit of priority to U.S. Provisional Application Ser. No. 63/029,298, entitled "Camera with Low-Profile Actuator Arrangement," filed May 22, 2020, and which is incorporated herein by reference in its entirety.

BACKGROUND

Technical Field

This disclosure relates generally to architecture for a camera having a low-profile actuator arrangement.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

Figure 1:
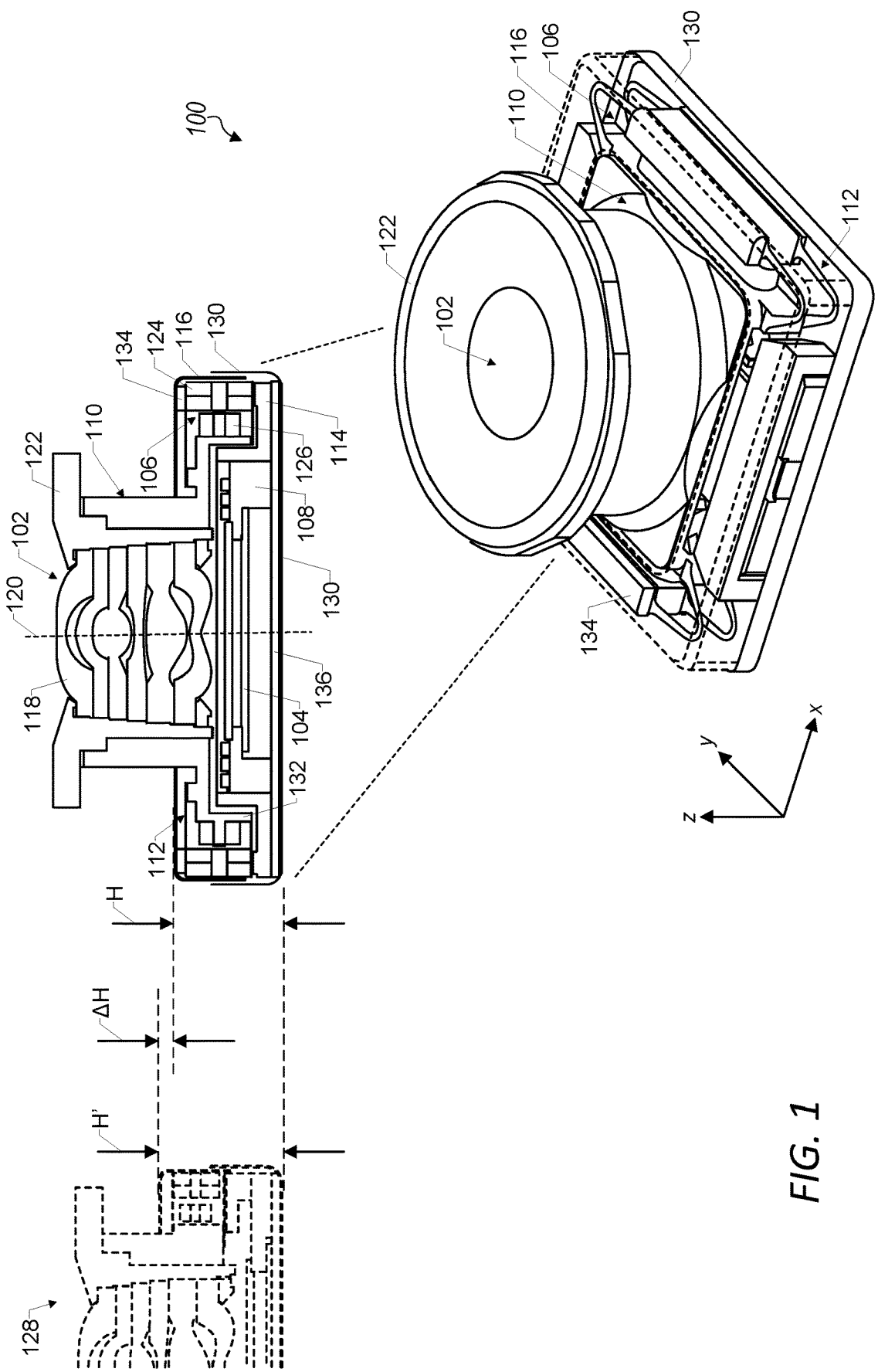
FIG. 1 illustrates a perspective view and a side cross-sectional view of an example camera having a low-profile actuator arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a camera having a low-profile actuator arrangement that may enable a size reduction. As used herein, the term "low-profile" ("low profile" in some contexts) may describe relatively small sizing and/or low positioning of one or more components and/or portions of the camera in a direction parallel to an optical axis of the camera. In various embodiments, the camera may include a voice coil motor (VCM) actuator to move a lens group and/or an image sensor of the camera. According to some embodiments, the VCM actuator may include one or more magnet-coil groups located beside an image sensor package (e.g., comprising an image sensor and a substrate coupled with one another) of the camera. In some embodiments, a magnet-coil group may be located between the image sensor package and a side wall of the camera. Additionally, or alternatively, the magnet-coil group may at least partially extend (e.g., in a direction parallel to an optical axis defined by the lens group) past an upper surface of the image sensor toward a bottom of the camera in some embodiments. In some embodiments, arranging components of the VCM actuator in this low-profile manner may enable a size reduction relative to some other cameras that have actuator components positioned above the image sensor substrate. In various embodiments, the size reduction may include a size reduction in a shoulder height dimension. Such a camera may be considered to have a low-profile shoulder relative to some other cameras that do not include the size reduction enabled by the low-profile actuator arrangement.

According to some embodiments, the camera may include a shield can that covers at least a portion of the camera. For example, the shield can may include a top wall and a side wall (which may form a side wall of the camera). The side wall may be interconnected with the top wall. Furthermore, the side wall may be oriented at a non-zero angle relative to the top wall. In various embodiments, the VCM actuator may include a magnet-coil group (e.g., comprising a magnet and a coil that are configured to electromagnetically interact with each other) disposed within a cavity that is located, in a first direction orthogonal to the optical axis, between at least a portion of the image sensor package and the side wall of the shield can. Furthermore, each of the magnet and the coil may at least partially extend, in a second direction parallel to the optical axis, past an upper surface of the image sensor toward a bottom of the camera. In some embodiments, the shoulder height dimension mentioned above may be a distance from the bottom surface of the camera to a top surface of the top wall of the shield can.

In some embodiments, the camera may include a lens carrier coupled with the lens group such that the lens carrier and the lens group are moveable together via the VCM actuator. The lens carrier may include a protrusion that extends, in the second direction parallel to the optical axis, past at least a portion of the image sensor package. In some embodiments, a first portion of the magnet-coil group may be attached to the protrusion, and a second portion of the magnet-coil group may be attached to one or more stationary structures of the camera.

According to some embodiments, the camera may be included in a device (e.g., a mobile device, a mobile multi-function device, etc.). The device may include one or more processors. Furthermore, the device may include memory storing program instructions executable by the one or more processors to control operations of the camera.

In some embodiments, the camera may be included in a multi-camera system. Such a system may include multiple cameras and a chassis for mounting the cameras, e.g., in a fixed position relative to one another. In some embodiments, the chassis, along with the mounted cameras, may be included in the device mentioned above. According to some examples, the device may include an outer cover that encases at least a portion of the device. The cameras may be attached to the chassis in a fixed position relative to the outer cover.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a perspective view and a side cross-sectional view of an example camera 100 having a low-profile actuator arrangement. The example X-Y-Z coordinate system shown in FIG. 1 may apply to embodiments discussed throughout this disclosure.

In some embodiments, the camera 100 may include a lens group 102, an image sensor 104, an actuator 106, a substrate 108, a lens carrier 110, a suspension arrangement 112, a base structure 114. and/or a shield can 116. The lens group 102 may include one or more lens elements 118 that define an optical axis 120. The image sensor 104 may be configured to capture image data based on light that passes through the lens group 102. In some embodiments, the image sensor 104 may be attached to the substrate 108, which may collectively be referred to herein as an "image sensor package." In some embodiments, the lens group 102 may be coupled with the lens carrier 110. According to some examples, the lens group 102 may be contained within a lens barrel 122, and the lens barrel 122 may be fixedly attached to the lens carrier 110. The lens group 102 may be coupled with the lens carrier 110 such that the lens group 102 is moveable together (e.g., in lockstep) with the lens carrier 110, e.g., via the actuator 106.

According to various embodiments, the actuator 106 may be configured to move the lens group 102 and/or the image sensor 104. For example, the actuator 106 may move the lens group 102 relative to the image sensor 104. Additionally, or alternatively, the actuator 106 may move the image sensor 104 relative to the lens group 102. In some embodiments, the actuator 106 may move the lens group 102 and/or the image sensor 104 in a direction parallel to the optical axis 120, e.g., to provide autofocus (AF) functionality. Additionally, or alternatively, the actuator 106 (and/or one or more other actuators of the camera 100) may move the lens group 102 and/or the image sensor 104 in one or more directions orthogonal to the optical axis 120, e.g., to provide optical image stabilization (OIS) functionality.

In various embodiments, the actuator 106 may comprise a voice coil motor (VCM) actuator. For example, the actuator 106 may include one or more magnets that electromagnetically interact with one or more coils (e.g., when current is supplied to the coil(s)) to produce Lorentz forces that move the lens group 102 and/or the image sensor 104.

In some embodiments, the actuator 106 may include one or more AF magnets 124 and one or more AF coils 126. According to various embodiments, the AF magnet(s) 124 may be coupled with the base structure 114 and/or the shield can 116. Furthermore, the AF coil(s) 126 may be coupled with the lens carrier 110 in various embodiments. In some examples, the AF magnet(s) 124 and the AF coil(s) 126 may be arranged so as to be in proximity with one another (e.g., in "magnet-coil group(s)," such as magnet-coil pair(s) and/or other magnet-coil grouping combination(s)) so as to be capable of electromagnetically interacting to produce Lorentz forces as discussed above.

As also discussed herein with reference to at least FIGS. 2A-3B, in various embodiments at least a portion of the actuator 106 may be located at one or more side portions of the camera 100. For example, a first magnet-coil group (comprising at least one magnet and at least one coil) may be positioned within a space at a first side of the camera 100, and a second magnet-coil group (comprising at least one magnet and at least one coil) may be positioned within a space at a second side of the camera 100. The second side of the camera may be opposite the first side relative to the lens group 102 and/or the lens carrier 110.

As indicated in FIG. 1, in some embodiments a magnet-coil group comprising a magnet and a coil may be disposed within a cavity that is located, in a first direction orthogonal to the optical axis 120 (e.g., the X-axis direction), between at least a portion of an image sensor package (comprising the image sensor 104 and the substrate 108) and a side wall of the camera 100 (e.g., a side wall of the shield can 116). Additionally, or alternatively, each of the magnet and the coil may be positioned so as to at least partially extend, in a second direction parallel to the optical axis (e.g., the Z-axis direction), past an upper surface of the image sensor toward a bottom of the camera 100. In some embodiments, arranging components of the actuator 106 in this low-profile manner may enable a size reduction in one or more dimensions of the camera 100, relative to some other cameras (e.g., camera 128) configured with actuator components positioned above the substrate 108 (e.g., in a space that extends, in the Z-axis direction, between the substrate 108 and the shield can 116). In various embodiments, the size reduction may include a size reduction in a shoulder height dimension H.

According to various embodiments, the shield can 116 may cover a portion of the camera 100. For example, the shield can 116 may be shaped to cover at least a top portion and one or more side portions of the camera 100. For example, the shield can 116 may include a top wall and one or more side walls. Furthermore, the shield can 116 may include one or more bend portions that interconnect the top wall with the side wall(s). In some examples, the bend portions may be formed by folding a sheet of material (e.g., sheet metal), e.g., into a shape configured to cover at least a portion of the actuator 106. According to some embodiments, the camera 100 may comprise a shoulder height dimension H that corresponds to the distance, in the Z-axis direction, between a bottom surface of the camera 100 and a top surface of the shield can 116. In some embodiments, the bottom surface of the camera 100 may be a lowermost surface of the camera 100. For example, the camera 100 may include a stiffener 130 that may form at least a portion of the bottom side of the camera 100. In some embodiments, the shoulder height dimension H may be the distance, in the Z-axis direction, between a bottom surface of the stiffener 130 and the top surface of shield can 116. In some embodiments, camera 128 (having a different example actuator arrangement) may have a shoulder height dimension H', which may be taller than the shoulder height dimension H. In FIG. 1, a reduction in shoulder height enabled by the actuator arrangement of camera 100 may be represented by a difference (ΔH) between the shoulder height dimension H' of camera 128 and the shoulder height dimension H of camera 100.

In some embodiments, the lens carrier 110 may include a protrusion 132 that extends, in the second direction parallel to the optical axis (e.g., the Z-axis direction), past at least a portion of the image sensor package, e.g., as indicated in FIG. 1. A first portion of a magnet-coil group may be attached to the protrusion. Furthermore, a second portion of the magnet-coil group may be attached to one or more stationary structures of the camera 100. In some embodiments, the one or more stationary structures may include the base structure 114, the shield can 116, etc. As indicated in FIG. 1, in some examples, the first portion of the magnet-coil group may include a coil (e.g., an AF coil 126) that is attached to the protrusion 132 of the lens carrier 110, and the second portion of the magnet-coil group may include a magnet (e.g., an AF magnet 124) that is attached to the base structure 114. In other embodiments, however, the first portion of the magnet-coil group may include a magnet (e.g., the AF magnet 124) that is attached to the protrusion 132 of the lens carrier 110, and the second portion of the magnet-coil group may include a coil (e.g., the AF coil 126) that is attached to the base structure 114 (and/or one or more other stationary structures of the camera 100).

In various embodiments, the suspension arrangement 112 may be configured to suspend the lens carrier 110 from one or more stationary structures of the camera 100. For example, the suspension arrangement 112 may suspend the lens carrier 110 from the base structure 114. Furthermore, the suspension arrangement 112 may allow controlled movement of the lens carrier 110 (e.g., in the second direction parallel to the optical axis) relative to the image sensor 104. As indicated in FIG. 1, and as discussed with reference to FIGS. 2A-2B, the suspension arrangement 112 may include an upper leaf spring (e.g., upper leaf spring 228 in FIG. 2) and/or a lower leaf spring (e.g., lower leaf spring 230 in FIG. 2). In some embodiments, the camera 100 may include one or more spacers 134. For example, the spacer(s) 134 may include a spring mounting spacer 134 used to mount a spring (e.g., an upper leaf spring) of the suspension arrangement. In some embodiments, such a spring mounting spacer 134 may be positioned, in the Z-axis direction, between one or more outer walls (e.g., a top wall of the shield can 116) of the camera 100 and a leaf spring (e.g., an upper leaf spring) of the suspension arrangement 112. For example, the spring mounting spacer 134 may be located adjacent to and/or proximate a side wall of the shield can 116, and the spring mounting spacer 134 may be vertically sandwiched between the shield can 116 and an upper leaf spring of the suspension arrangement 112.

In various embodiments, the camera 100 may include a flex circuit 136 that may be configured to convey electrical signals (e.g., power and/or control signals). In some embodiments, the flex circuit 136 may be used to convey certain signals (e.g., signals associated with image data captured via the image sensor 104, signals associated with position sensor data captured via one or more position sensors, etc.) to one or more components that are external to the camera 100, such as an image signal processor (ISP) of a device (e.g., the device 402 in FIG. 4, the computer system 500 in FIG. 5, etc.). The flex circuit 136 may convey such signals to the image sensor 104 via the substrate 108 in some examples. Furthermore, the flex circuit 136 may be used to convey control signals (e.g., signals associated with actuator commands from controller(s) of the ISP) to the coil(s) of the actuator 106. For example, the flex circuit 136 may convey control signals to the AF coils 126 via the substrate 108, the suspension arrangement 112, and/or the lens carrier 110. In some embodiments, the stiffener 130 may include a bottom wall disposed adjacent to a bottom surface of the flex circuit 136. The stiffener 130 may provide structural support to the flex circuit 136 and/or one or more other portions of the camera 100. According to some examples, the stiffener 130 may one or more side walls (which also may be referred to as "tabs") that are interconnected with the bottom wall of the stiffener 130. In some embodiments, the tab(s) of the stiffener 130 may be folded up from the bottom wall of the stiffener 130, e.g., to at least partially establish one or more sides of the camera 100. As indicated in FIG. 1, in some embodiments a tab of the stiffener 130 may partially overlap with a corresponding side wall of the shield can 116, and the overlapping tab and side wall may form a side of the camera 100.

Figure 2B:
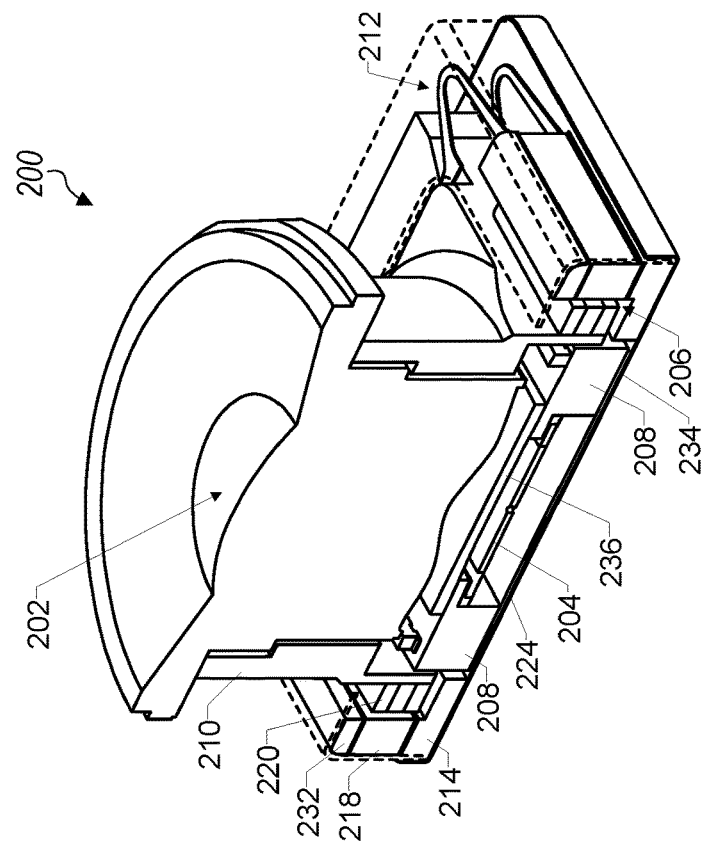
FIGS. 2A-2B illustrate perspective cross-sectional views of an example camera having a low-profile actuator arrangement, in accordance with some embodiments.
Figure 2A:
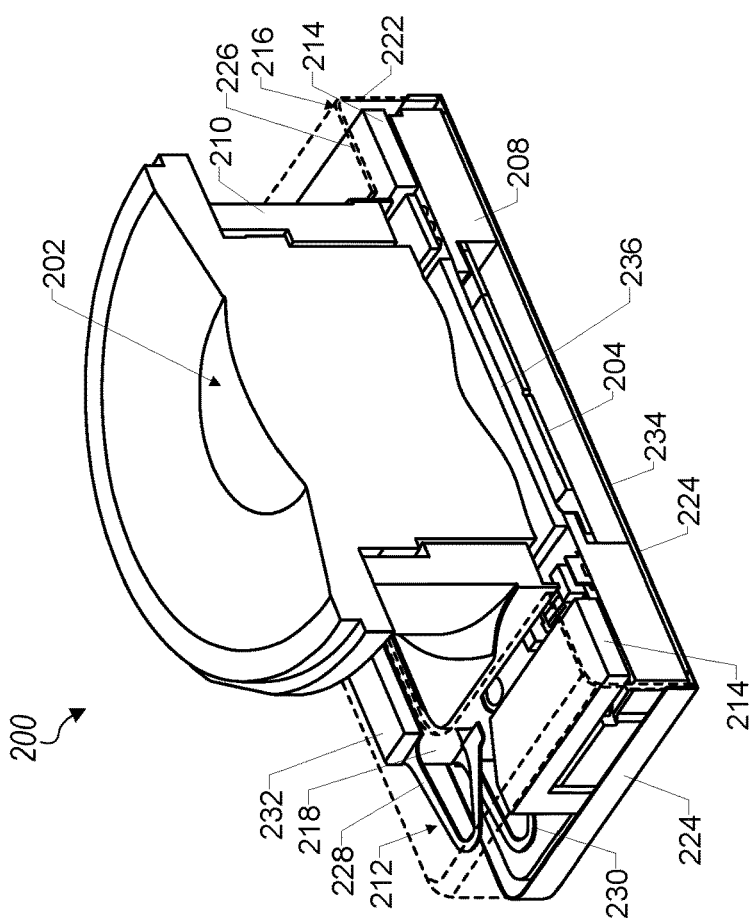

FIGS. 2A-2B illustrate perspective cross-sectional views of an example camera 200 having a low-profile actuator arrangement. FIG. 2A shows a perspective cross-sectional view of the camera 200 where the cross-section is taken along a plane that is parallel to the Y-Z plane indicated in FIG. 1. FIG. 2B shows a perspective cross-sectional view of the camera 200 where the cross-section is taken along a plane that is parallel to the X-Z plane indicated in FIG. 1.

In some embodiments, the camera 200 may include a lens group 202, an image sensor 204, an actuator 206, a substrate 208, a lens carrier 210, a suspension arrangement 212, a base structure 214, and/or a shield can 216. According to various embodiments, the camera 200 may be the same as, or similar to, the camera 100 described herein with reference to FIG. 1. For example, the lens group 202, the image sensor 204, the actuator 206, the substrate 208, the lens carrier 210, the suspension arrangement 212, the base structure 214, and/or the shield can 216, respectively, may be the same as, or similar to, the lens group 102, the image sensor 104, the actuator 106, the substrate 108, the lens carrier 110, the suspension arrangement 112, the base structure 114, and/or the shield can 116.

According to some embodiments, the camera 200 may include two magnet-coil groups: a first magnet-coil group positioned in a space to a first side of the lens group 202 (e.g., positioned, in the X-axis direction, between the lens group 202 and a first side wall of the camera 200), and a second magnet-coil group positioned in a space to a second side of the lens group 202 (e.g., positioned, in the X-axis direction, between the lens group 202 and a second side wall of the camera 200 that is opposite the first side wall of the camera 200). In some embodiments, the camera 200 may not have a magnet-coil group positioned in a space to a third side (e.g., no magnet-coil group positioned, in the Y-axis direction, between the lens group 202 and a third side wall of the camera 200) and/or a fourth side of the lens group 202 (e.g., no magnet-coil group positioned, in the Y-axis direction, between the lens group 202 and a fourth side wall of the camera 200 that is opposite the third side wall of the camera 200). In some embodiments, the first magnet-coil group may have a longest dimension in the Y-axis direction. Additionally, or alternatively, the first magnet-coil group may have a longest dimension that is parallel to the first side wall of the camera 200. In some embodiments, the second magnet-coil group may have a longest dimension in the Y-axis direction. Additionally, or alternatively, the second magnet-coil group may have a longest dimension that is parallel to the second side wall of the camera 200. Embodiments of the cameras disclosed herein are not limited to two magnet-coil groups; various embodiments may include fewer or more magnet-coil groups.

As indicated in FIGS. 2A-2B, various components of the camera 200 may have respective cross-sectional shapes that vary at different portions of the camera 200. For example, in the cross-section shown in FIG. 2A, the substrate 208, the lens carrier 210, and/or the base structure 214 may have a respective shape that is different than shown for the same component(s) in FIG. 2B.

In some embodiments, the substrate 208 may have a cross-sectional shape that is longer in the Y-axis direction (e.g., as indicated in FIG. 2A) than in the X-axis direction (e.g., as indicated in FIG. 2B). The shorter dimension of the substrate 208 in the X-axis direction may provide space for positioning the magnet-coil group(s) of the actuator 206, one or more portions of the lens carrier (e.g., protrusions 132 in FIG. 1), and/or one or more portions of the base structure 214, in the X-axis direction, between the lens group 202 and the side wall(s) of the camera 200.

According to some embodiments, the protrusions of the lens carrier 210 may extend, in the Z-axis direction, at side portion(s) that have magnet-coil group(s) to a greater extent than extension(s) of the lens carrier 210 at side portion(s) that do not have magnet-coil group(s). As noted above, the shorter dimension of the substrate 208 in the X-axis direction may provide space for the protrusions of the lens carrier 210. The longer dimension of the substrate 208 in the Y-axis direction and/or the absence of protrusions at side portions(s) that do not have magnet-coil group(s), may provide space for coupling one or more components (e.g., electrical components) to the substrate 208 (e.g., electrical component(s) mounted on a top surface of the substrate 208, position sensor(s), and/or driver integrated circuit(s), etc.), e.g., in spaces between the image sensor 204 and the base structure 214 as indicated in FIG. 2A.

In various embodiments, the base structure 214 may at least partially encircle the image sensor package. As indicated in FIG. 2A, the base structure 214 may extend above the substrate 208 at side portion(s) that do not have magnet-coil group(s). As indicated in FIG. 2B, the base structure 214 may extend beside the substrate 208 at side portion(s) that have magnet-coil group(s), with the base structure 214 having a low profile that provides space for the magnet-coil group(s), e.g., to enable the low-profile actuator arrangement of the camera 200. The magnet-coil group(s) may be positioned above the substrate 208.

In some embodiments, the actuator 206 may include one or more magnets that electromagnetically interact with one or more coils (e.g., when current is supplied to the coil(s)) to produce Lorentz forces that move the lens group 202 and/or the image sensor 204. In some embodiments, the actuator 206 may include one or more AF magnets 218 and one or more AF coils 220. According to various embodiments, the AF magnet(s) 218 may be coupled with the base structure 214 and/or the shield can 216. Furthermore, the AF coil(s) 220 may be coupled with the lens carrier 210 (e.g., attached to the protrusion(s) of the lens carrier 210) in various embodiments. In some examples, the AF magnet(s)

218 and the AF coil(s) 220 may be arranged so as to be in proximity with one another (e.g., in magnet-coil group(s) as indicated in FIG. 2B) so as to be capable of electromagnetically interacting to produce Lorentz forces that move the lens group 202 and/or the image sensor 204 in the direction parallel to the optical axis.

As discussed above, in various embodiments at least a portion of the actuator 206 may be located at one or more side portions of the camera 200. For example, a first magnet-coil group (comprising at least one magnet and at least one coil) may be positioned within a space at a first side of the camera 200, and a second magnet-coil group (comprising at least one magnet and at least one coil) may be positioned within a space at a second side of the camera 200. The second side of the camera may be opposite the first side relative to the lens group 202 and/or the lens carrier 210.

As indicated in FIG. 2B, in some embodiments a magnet-coil group comprising a magnet and a coil may be disposed within a cavity that is located, in a first direction orthogonal to the optical axis (e.g., the X-axis direction), between at least a portion of an image sensor package (comprising the image sensor 204 and the substrate 208) and a side wall of the camera 200 (e.g., a side wall 222 of the shield can 216). Additionally, or alternatively, each of the magnet and the coil may be positioned so as to at least partially extend, in a second direction parallel to the optical axis (e.g., the Z-axis direction), past an upper surface of the image sensor 204 toward a bottom of the camera 200. In some embodiments, arranging components of the actuator 206 in this low-profile manner may enable a size reduction in a shoulder height dimension (e.g., indicated as "H" in FIG. 1) that corresponds to the distance, in the Z-axis direction, between a bottom surface of the camera (e.g., a bottom surface of a stiffener 224) and a top surface of a top wall 226 of the shield can 216.

In some embodiments, the suspension arrangement 212 may include one or more upper leaf springs 228 and/or one or more lower leaf springs 230. For example, as indicated in FIGS. 2A-2B, the suspension arrangement may include upper leaf spring(s) 228 and/or lower leaf spring(s) 230 positioned at corner portions of the camera 200. The upper leaf spring(s) 228 and/or lower leaf spring(s) 230 may extend along one or more planes that are orthogonal to an optical axis (e.g., optical axis 120 in FIG. 1) in some embodiments. According to some embodiments, the upper leaf spring(s) 228 and/or lower leaf spring(s) 230 may connect the lens carrier 210 to one or more stationary structures of the camera 200. For example, one end of a leaf spring may be attached to the lens carrier 210 and another end of the leaf spring may be attached to a magnet (e.g., the AF magnet 218) of the actuator and/or to a spring mounting spacer 232 of the camera 200.

In some embodiments, the camera 200 may include a flex circuit 234 disposed below the image sensor package, e.g., sandwiched between the substrate 208 and the stiffener 224. Furthermore, the camera 200 may include one or more optical filters 236 (e.g., an infrared filter) coupled with the substrate 208 and positioned, in the Z-axis direction, between the lens group 202 and the image sensor 204.

Figure 3B:
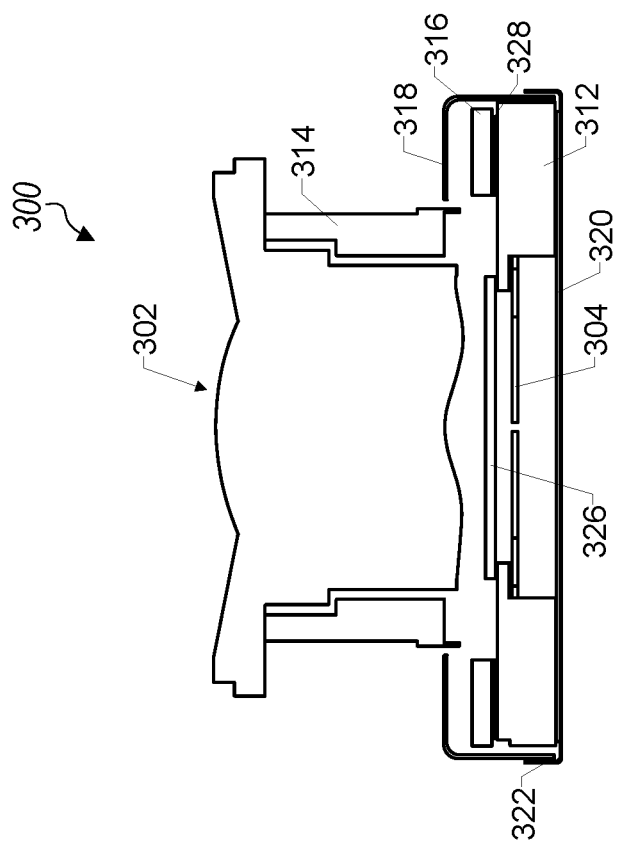
FIGS. 3A-3B illustrate side cross-sectional views of an example camera having a low-profile actuator arrangement, in accordance with some embodiments.
Figure 3A:
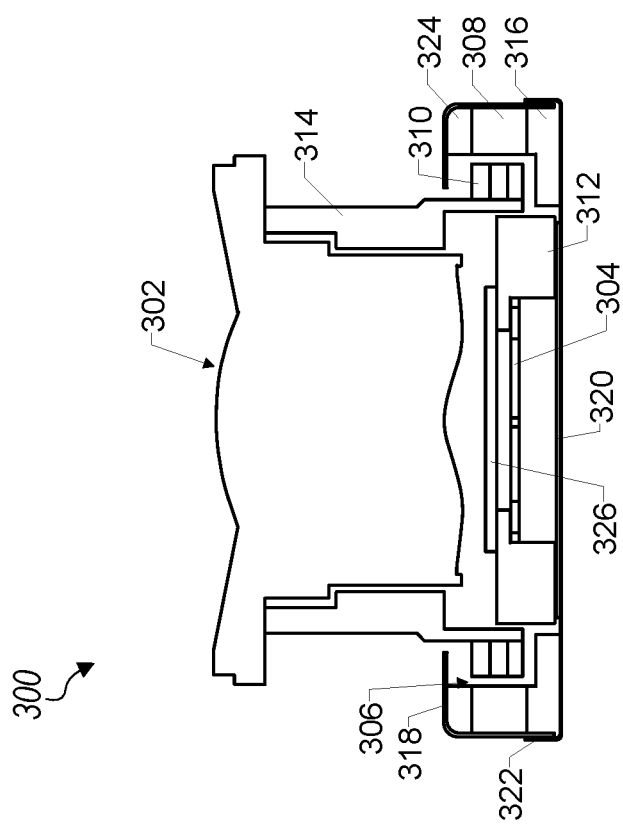

FIGS. 3A-3B illustrate side cross-sectional views of an example camera 300 having a low-profile actuator arrangement. FIG. 3A shows a side cross-sectional view of the camera 300 where the cross-section is taken along a plane that is parallel to the X-Z plane indicated in FIG. 1. FIG. 3B shows a side cross-sectional view of the camera 300 where the cross-section is taken along a plane that is parallel to the Y-Z plane indicated in FIG. 1.

In some embodiments, the camera 300 may include a lens group 302, an image sensor 304, an actuator 306 (e.g., comprising magnet(s) 308 and coil(s) 310), a substrate 312, a lens carrier 314, a suspension arrangement (e.g., suspension arrangement 212 in FIG. 2), a base structure 316, a shield can 318, a flex circuit 320, a stiffener 322, one or more spacers 324, and/or one or more optical filters 326. According to various embodiments, the camera 300 may be the same as, or similar to, the camera 100 and/or the camera 200 described herein with reference to FIGS. 1-2B.

FIG. 3B indicates a bond line 328 at which the base structure 316 may be bonded to the substrate 312 in some embodiments. According to some examples, the bond line 328 may comprise an active alignment bond line between a bottom surface of the base structure 316 and a top surface of the substrate 312.

Figure 4:
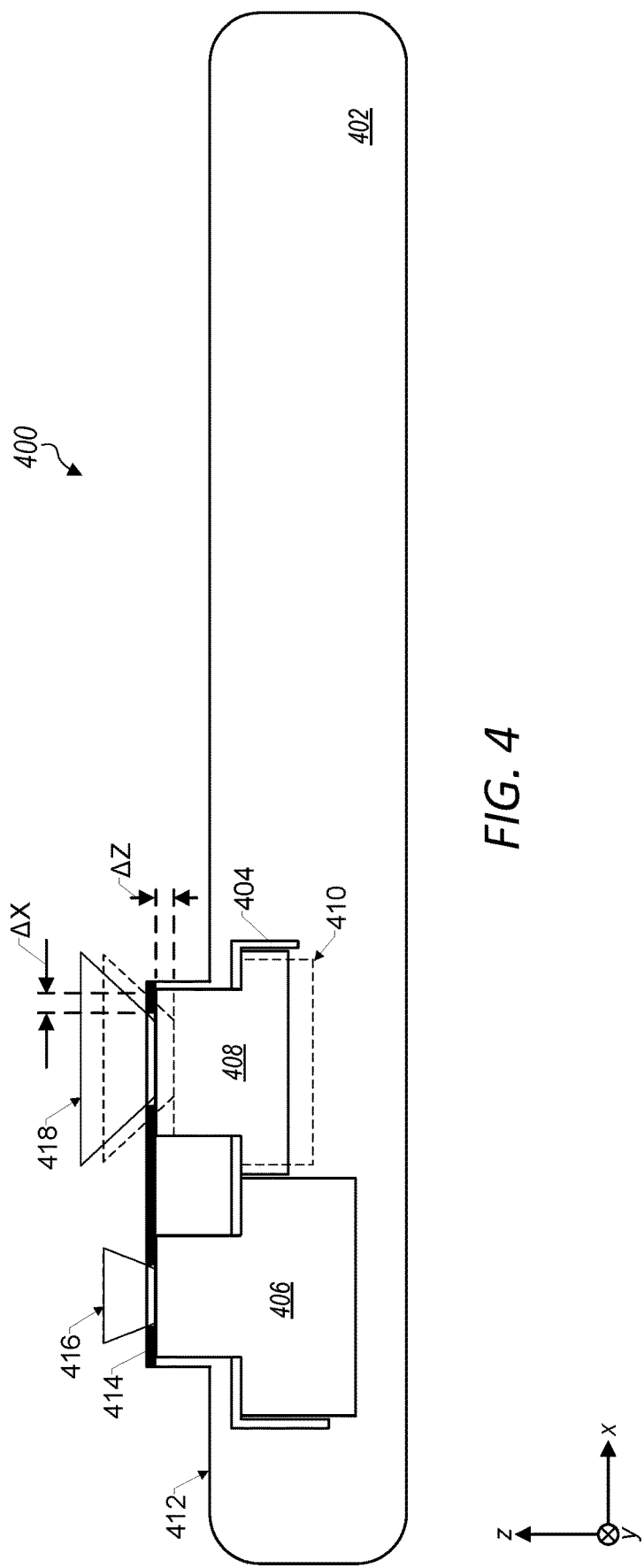
FIG. 4 illustrates a schematic side view of an example multi-camera system that may include a camera having a low-profile actuator arrangement, in accordance with some embodiments.

FIG. 4 illustrates a schematic side view of an example multi-camera system 400 that may include a camera (e.g., camera 100 in FIG. 1, camera 200 in FIGS. 2A-2B, and/or camera 300 in FIGS. 3A-3B, etc.) having a low-profile actuator arrangement. In some embodiments, the system 400 may include a device 402 (e.g., any of various types of devices described herein with reference to FIG. 5), a chassis 404 for mounting multiple cameras, a first camera 406, and/or a second camera 408 (e.g., a camera having a low-profile actuator arrangement as described herein with reference to FIGS. 1-3B). The first camera 406 and the second camera 408 may be attached to the chassis 404 in some embodiments. While the system 400 in FIG. 4 indicates that the chassis 404 has two cameras attached to it, the chassis 404 and/or the system 400 may be configured to accommodate fewer or more than two cameras.

FIG. 4 shows an example profile 410 associated with a camera (e.g., camera 128 in FIG. 1) having an actuator arrangement that is different than the low-profile actuator arrangement of the second camera 408. As compared with the profile 410, the lens group and/or the lens barrel of the second camera 408 may be mounted closer to a side wall of the device 402, e.g., so as to be placed near a cover window of an enclosure 412 (also referred to herein as an "outer cover") that encases at least a portion of the device 402. In some embodiments, the cover window may include an inner surface and/or an outer surface at which a black mask 414 may be applied. The black mask 414 may define a respective region ("black mask opening") configured to allow light to pass to each of the cameras (e.g., unmasked regions aligned with apertures of the cameras), and each black mask opening may have a diameter referred to herein as a "black mask opening diameter." In some embodiments, placement of the second camera 408 relative to the chassis 404 and/or relative to the enclosure 412 may be based, at least in part, on the second camera's 408 low-profile actuator arrangement that may enable a reduced shoulder height dimension, e.g., relative to the profile 410. In some embodiments, closer placement of the second camera 408 to the cover window (e.g., relative to the profile 410) may enable a reduction, in the X-axis direction, of the black mask opening diameter for the second camera 408, e.g., as indicated by ΔX in FIG. 4. Additionally, or alternatively, the placement of the second camera 408 may enable a reduction, in the Z-axis direction, of wasted space between the second camera 408 and the cover window, e.g., as indicated by ΔZ in FIG. 4.

According to some embodiments, the first camera 406 may be configured with a first focal length. The second camera 408 may be configured with a second focal length that is different than the first focal length. In some embodiments, the first camera 406 may have a first field of view (FOV) indicated by FOV cone 416, and the second camera 408 may have a second FOV indicated by FOV cone 418.

Figure 5:
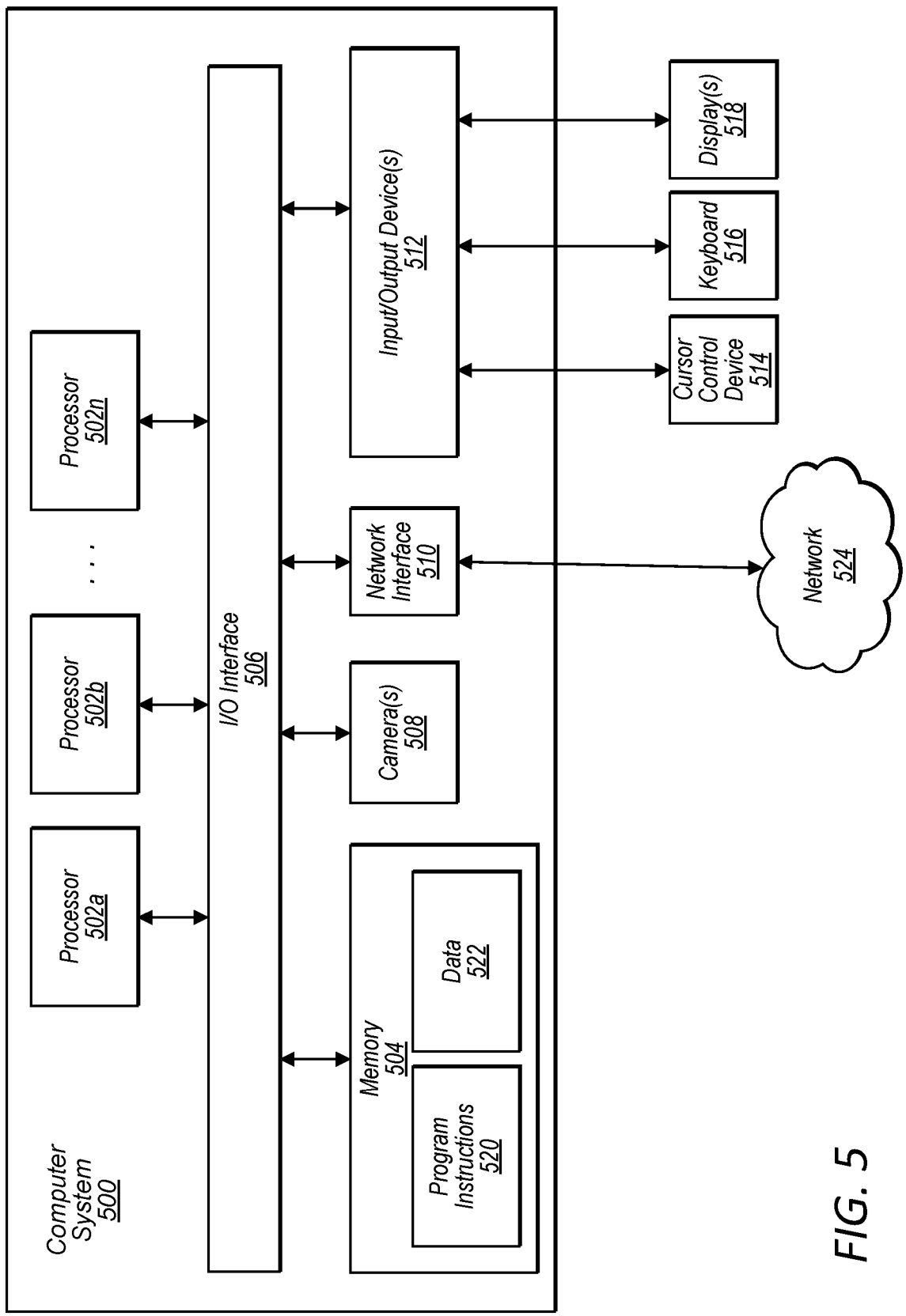
FIG. 5 illustrates an example computer system that may include a camera having a low-profile actuator arrangement, in accordance with some embodiments.

FIG. 5 illustrates an example computing device, referred to as computer system 500, that may include or host embodiments of a camera having an actuator arrangement that may enable a size reduction, e.g., as described herein with reference to FIGS. 1-4. In addition, computer system 500 may implement methods for controlling operations of the camera and/or for performing image processing images captured with the camera.

The computer system 500 may be configured to execute any or all of the embodiments described above. In different embodiments, computer system 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 500 includes one or more processors 502 coupled to a system memory 504 via an input/output (I/O) interface 506. Computer system 500 further includes one or more cameras 508 coupled to the I/O interface 506. Computer system 500 further includes a network interface 510 coupled to I/O interface 506, and one or more input/output devices 512, such as cursor control device 514, keyboard 516, and display(s) 518. In some cases, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 502, or a multiprocessor system including several processors 502 (e.g., two, four, eight, or another suitable number). Processors 502 may be any suitable processor capable of executing instructions. For example, in various embodiments processors 502 may be general-purpose or embedded processors implementing any of a variety of instruction set architectures (ISAs), such as the x86, PowerPC, SPARC, or MIPS ISAs, or any other suitable ISA. In multiprocessor systems, each of processors 502 may commonly, but not necessarily, implement the same ISA.

System memory 504 may be configured to store program instructions 520 accessible by processor 502. In various embodiments, system memory 504 may be implemented using any suitable memory technology, such as static random access memory (SRAM), synchronous dynamic RAM (SDRAM), nonvolatile/Flash-type memory, or any other type of memory. Additionally, existing camera control data 522 of memory 504 may include any of the information or data structures described above. In some embodiments, program instructions 520 and/or data 522 may be received, sent or stored upon different types of computer-accessible media or on similar media separate from system memory 504 or computer system 500. In various embodiments, some or all of the functionality described herein may be implemented via such a computer system 500.

In one embodiment, I/O interface 506 may be configured to coordinate I/O traffic between processor 502, system memory 504, and any peripheral devices in the device, including network interface 510 or other peripheral interfaces, such as input/output devices 512. In some embodiments, I/O interface 506 may perform any necessary protocol, timing or other data transformations to convert data signals from one component (e.g., system memory 504) into a format suitable for use by another component (e.g., processor 502). In some embodiments, I/O interface 506 may include support for devices attached through various types of peripheral buses, such as a variant of the Peripheral Component Interconnect (PCI) bus standard or the Universal Serial Bus (USB) standard, for example. In some embodiments, the function of I/O interface 506 may be split into two or more separate components, such as a north bridge and a south bridge, for example. Also, in some embodiments some or all of the functionality of I/O interface 506, such as an interface to system memory 504, may be incorporated directly into processor 502.

Network interface 510 may be configured to allow data to be exchanged between computer system 500 and other devices attached to a network 524 (e.g., carrier or agent devices) or between nodes of computer system 500. Network 524 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 510 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 512 may, in some embodiments, include one or more display terminals, keyboards, keypads, touchpads, scanning devices, voice or optical recognition devices, or any other devices suitable for entering or accessing data by one or more computer systems 500. Multiple input/output devices 512 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 510.

Those skilled in the art will appreciate that computer system 500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens group comprising one or more lens elements that define an optical axis;
an image sensor package, comprising:
   a substrate; and
   an image sensor attached to the substrate, the image sensor to capture image data based on light that passes through the lens group;
a voice coil motor (VCM) actuator to move at least one of the lens group or the image sensor, the VCM actuator comprising:
   a magnet-coil group, comprising:
      a magnet; and
      a coil to electromagnetically interact with the magnet;
   wherein:
      the magnet-coil group is disposed within a cavity that is located, in a first direction orthogonal to the optical axis, between at least a portion of the image sensor package and a side wall of the camera; and
      each of the magnet and the coil at least partially extends, in a second direction parallel to the optical axis, past an upper surface of the image sensor toward a bottom of the camera; and
a lens carrier coupled with the lens group such that the lens carrier and the lens group are moveable together via the VCM actuator, wherein the lens carrier comprises a protrusion that extends, in the second direction parallel to the optical axis, past at least a portion of the image sensor package;
wherein:
   a first portion of the magnet-coil group is attached to the protrusion; and
   a second portion of the magnet-coil group is attached to one or more stationary structures of the camera.

2. The camera of claim 1, further comprising:
a shield can that covers at least a portion of the camera, the shield can comprising:
   a top wall; and
   the side wall of the camera, wherein the side wall is interconnected with the top wall and that is oriented at a non-zero angle relative to the top wall.

3. The camera of claim 1, further comprising:
a base structure that encircles at least a portion of the image sensor package;
wherein:
   the first portion of the magnet-coil group comprises the coil;
   the second portion of the magnet-coil group comprises the magnet; and
   the one or more stationary structures comprise the base structure.

4. The camera of claim 3, further comprising:
a suspension arrangement that suspends the lens carrier from the base structure and that allows movement of the lens carrier, in at least the second direction parallel to the optical axis, relative to the image sensor.

5. The camera of claim 4, wherein the suspension arrangement comprises at least one of:
an upper leaf spring that extends, in the first direction orthogonal to the optical axis, from above the magnet to the lens carrier; or
a lower leaf spring that extends, in the first direction, from below the magnet to the lens carrier.

6. The camera of claim 5, further comprising at least one of:
one or more spacers compressed between a shield can and the upper leaf spring and configured to mount the upper leaf spring in the camera; or
one or more spacers compressed between the shield can and the lower leaf spring and configured to mount the lower leaf spring in the camera.

7. A device, comprising:
one or more processors;
memory storing program instructions executable by the one or more processors to control operations of a camera; and the camera, comprising:
   a lens group comprising one or more lens elements that define an optical axis;
   an image sensor package, comprising:
      a substrate; and
      an image sensor attached to the substrate, the image sensor to capture image data based on light that passes through the lens group;
   a voice coil motor (VCM) actuator to move at least one of the lens group or the image sensor, the VCM actuator comprising:
      a magnet-coil group, comprising:
         a magnet; and
         a coil to electromagnetically interact with the magnet;
      wherein:
         the magnet-coil group is disposed within a cavity that is located, in a first direction orthogonal to the optical axis, between at least a portion of the image sensor package and a side wall of the camera; and
         each of the magnet and the coil at least partially extends, in a second direction parallel to the optical axis, past an upper surface of the image sensor toward a bottom of the camera; and
   a lens carrier coupled with the lens group such that the lens carrier and the lens group are moveable together via the VCM actuator, wherein the lens carrier comprises a protrusion that extends, in the second direction parallel to the optical axis, past at least a portion of the image sensor package;
   wherein:
      a first portion of the magnet-coil group is attached to the protrusion; and
      a second portion of the magnet-coil group is attached to one or more stationary structures of the camera.

8. The device of claim 7, wherein the camera further comprises:
   a shield can that covers at least a portion of the camera, the shield can comprising:
      a top wall; and
      the side wall of the camera, wherein the side wall is interconnected with the top wall and that is oriented at a non-zero angle relative to the top wall.

9. The device of claim 7, wherein the camera further comprises:
   a base structure that encircles at least a portion of the image sensor package;
   wherein:
      the first portion of the magnet-coil group comprises the coil;
      the second portion of the magnet-coil group comprises the magnet; and
      the one or more stationary structures comprise the base structure.

10. The device of claim 9, wherein the camera further comprises:
   a suspension arrangement that suspends the lens carrier from the base structure and that allows movement of the lens carrier, in at least the second direction parallel to the optical axis, relative to the image sensor.

11. The device of claim 10, wherein the suspension arrangement comprises at least one of:
   an upper leaf spring that extends, in the first direction orthogonal to the optical axis, from above the magnet to the lens carrier; or
   a lower leaf spring that extends, in the first direction, from below the magnet to the lens carrier.

12. The device of claim 11, further comprising at least one of:
   one or more spacers compressed between a shield can and the upper leaf spring and configured to mount the upper leaf spring in the camera; or
   one or more spacers compressed between the shield can and the lower leaf spring and configured to mount the lower leaf spring in the camera.

13. The device of claim 7, wherein the VCM actuator comprises an autofocus (AF) actuator to move the lens group in the second direction parallel to the optical axis.

14. The device of claim 7, wherein:
   the camera is a first camera; and
   the device further comprises:
      a second camera;
      an outer cover that encases at least a portion of the device; and
      a chassis to which the first camera and the second camera are attached in a fixed position relative to the outer cover.

15. The device of claim 14, wherein:
   the first camera is configured with a first focal length; and
   the second camera is configured with a second focal length different than the first focal length.

16. A system, comprising:
   a chassis for mounting multiple cameras;
   a first camera attached to the chassis, wherein a portion of the first camera extends through a first aperture defined by the chassis;
   a second camera attached to the chassis, wherein a portion of the second camera extends through a second aperture defined by the chassis, and wherein the second camera comprises:
      a lens group comprising one or more lens elements that define an optical axis;
      an image sensor package, comprising:
         a substrate; and
         an image sensor attached to the substrate, the image sensor to capture image data based on light that passes through the lens group;
      a voice coil motor (VCM) actuator to move at least one of the lens group or the image sensor, the VCM actuator comprising:
         a magnet-coil group, comprising:
            a magnet; and
            a coil to electromagnetically interact with the magnet;
         wherein:
            the magnet-coil group is disposed within a cavity that is located, in a first direction orthogonal to the optical axis, between at least a portion of the image sensor package and a side wall of the second camera; and
            each of the magnet and the coil at least partially extends, in a second direction parallel to the optical axis, between past an upper surface of the image sensor toward a bottom of the second camera;
      a lens carrier coupled with the lens group such that the lens carrier and the lens group are moveable together via the VCM actuator, wherein the lens carrier comprises a protrusion that extends, in the second direction parallel to the optical axis, past at least a portion of the image sensor package;

wherein:
a first portion of the magnet-coil group is attached to the protrusion; and
a second portion of the magnet-coil group is attached to one or more stationary structures of the camera.

17. The system of claim 16, wherein the second camera further comprises:
a shield can that covers at least a portion of the second camera, the shield can comprising:
a top wall; and
the side wall of the second camera, wherein the side wall is interconnected with the top wall and that is oriented at a non-zero angle relative to the top wall.

18. The system of claim 16, wherein the second camera further comprises:
a base structure that encircles at least a portion of the image sensor package;

wherein:
the coil is attached to the protrusion; and
the magnet is attached to the one or more stationary structures of the camera.

19. The system of claim 18, wherein:
the magnet-coil group is a first magnet-coil group;
the side wall is a first side wall of the camera; and
the VCM actuator further comprises:
a second magnet-coil group disposed between the image sensor package and a second side wall of the camera, wherein the second side wall is opposite the first side wall relative to the lens group.

20. The system of claim 18, wherein the second camera further comprises:
a suspension arrangement that suspends the lens carrier from the base structure and that allows movement of the lens carrier, in at least the second direction parallel to the optical axis, relative to the image sensor.

* * * * *